(12) United States Patent
Lomakin

(10) Patent No.: US 6,855,188 B1
(45) Date of Patent: Feb. 15, 2005

(54) MULTICHAMBERED STEELMAKING APPARATUS AND METHOD OF STEELMAKING

(76) Inventor: Vladimir Maximovich Lomakin, 41. Domenschikov, d.15, kv. 1, Magnitogorsk, 455049 (RU)

( * ) Notice: Subject to any disclaimer, the term of this patent is extended or adjusted under 35 U.S.C. 154(b) by 0 days.

(21) Appl. No.: 09/958,505

(22) PCT Filed: Dec. 9, 1999

(86) PCT No.: PCT/RU99/00478
§ 371 (c)(1), (2), (4) Date: Oct. 9, 2001

(87) PCT Pub. No.: WO01/01057
PCT Pub. Date: Jan. 4, 2001

(30) Foreign Application Priority Data
Jun. 25, 1999  (RU) .......................................... 99114074

(51) Int. Cl.⁷ .............................................. C22B 7/10
(52) U.S. Cl. ..................... 75/507; 266/240; 266/900; 266/901
(58) Field of Search ................................ 266/240, 200, 266/900, 901; 75/507

(56) References Cited
U.S. PATENT DOCUMENTS
3,248,211 A * 4/1966 Klein et al. .................... 75/507
3,869,051 A * 3/1975 Sczerba ....................... 266/240

FOREIGN PATENT DOCUMENTS
GB   1042988   * 9/1966
GB   1062076   * 3/1967

* cited by examiner

Primary Examiner—Scott Kastler
(74) Attorney, Agent, or Firm—Myron Greenspan, Esq.; Lackenbach Siegel LLP

(57) ABSTRACT

The invention pertains to the art of ferrous metallurgy, and more particularly, to a multichambered steelmaking apparatus and to a method of steelmaking. A multichambered steelmaking apparatus contains smelting chambers communicating with each other through their upper portions. Process input ports are provided in the chamber side wall, and the smelting chambers are provided with gas-oxygen burners installed on the walls of the smelting chambers facing each other. A method of steel making employs the apparatus in a unique manner. During operation, the smelting chambers are tilted in the direction of the input port and during the discharge of steel they are tilted in the direction of the outlet. During the melting stage carbon monoxide (CO) is afterburned by gas-oxygen burners forming carbon dioxide (CO) in the exit gasses supplied to the gas exhaust system through the coaxial chamber. A portion of a slag from the previous heat is retained.

15 Claims, 2 Drawing Sheets

MULTICHAMBERED STEELMAKING APPARATUS AND METHOD OF STEELMAKING

PRIORITY CLAIM

This application claims priority from PCT/RU99/00478 filed Dec. 9, 1999, which in turn claims priority from Russian Application Ser. No. 99114074 filed Jun. 25, 1999.

FIELD OF THE INVENTION

The offered group of inventions pertains to the art of ferrous metallurgy, and more particularly, to a design of a multichambered steelmaking apparatus and to a method of steelmaking using such apparatus.

BACKGROUND OF THE INVENTION

Known is a multichambered steelmaking apparatus comprising smelting chambers communicating with each other through their upper portions. Each smelting chamber contains two input ports for charging metal scrap and pouring-in liquid iron (said ports being provided in the front wall of each chamber) and a process port arranged between said input ports. A hearth of each chamber has an outlet. Embrasure orifices, intended for enabling introduction of oxygen supply tuyeres into the operating area, are provided in the chambers roof. The upper portion of the chambers front wall, said upper portion being arranged above the thresholds level, is provided to be tilted at a predetermined angle relative to the vertical in the direction of a back wall (UA, 9024 A, F 27 B 3/02, F 27 D 3/00, F 27 D 3/14, publication of Sep. 30, 1996). The described apparatus was chosen as a prototype of the offered invention.

The above-described design of apparatus enables mold-less charging of metal scrap and direct pouring-in of liquid iron from a ladle through input ports. Such design enables the apparatus efficiency to be increased due to more rapid loading of scrap and liquid iron.

Though the above-described apparatus has certain drawbacks, such as the lack of the front wall strength, too complicated fastening of input ports due to the inclination of the front wall in the direction of the back wall, insufficient metal scrap charging speed, difference of loads influencing the roof from the front and back lines of the apparatus. All these circumstances affect the strength of apparatus and reduce the up-to-repair life of apparatus, which generally results in the apparatus output decrease. Furthermore, the chamber being stationary, the quasi-thresholds and "combs" must be provided in the input ports and in a process port. The described design properties are necessary to avoid splash-out of molten metal and slag. Thus, expenditure of crude dolomite and magnesite powder increases. Consequently, smelting time increases as well.

DISCLOSURE OF THE INVENTION

It is an object of the present invention to provide a multichambered steelmaking apparatus of a simplified design characterized by broadened technological features and high efficiency.

It is another, technical object of the present invention to increase strength of the apparatus and to simplify design thereof. The present invention accomplishes these objects as described below.

A multichambered steelmaking apparatus comprises two smelting chambers communicating with each other through their upper portions. Each of said smelting chambers contains a roof, a hearth with an outlet arranged on the side of said smelting chamber back wall, side walls and a front wall with two input ports and a process port arranged between said input ports, metal scrap charging scoops, oxygen supply tuyeres installed in the roof, a gas exhaust channel provided with a gas-cleaning system and a chimney. Each of the smelting chambers comprises a tilting device and is provided with capability of tilting in the direction of the front and back walls at an angle of up to 45° relative to its vertical axis, furthermore, the gas-oxygen burners are installed in the roof on the side of the smelting chamber side walls. Each smelting chamber comprises three oxygen supply tuyeres and two gas-oxygen burners. The sizes of the input ports correspond to the sizes of the metal scrap charging scoops.

As far as the smelting chambers according to the invention are provided with capability of rotating about their horizontal axes, the scrap charging and liquid iron pouring-in, molten metal discharging and slagging-off processes are simplified. Thus execution of quasi-thresholds and combs in the process input ports, installation of pouring-in and discharging chutes is not required as far as while charging metalline charge and pouring-in liquid iron as well as during discharging the molten metal and slagging-off the tilting of chambers takes place. The described design feature not only ensures favorable conditions of work in the furnace shop but also enables reduction of crude dolomite and magnesite powder expenditure.

The input ports sizes are extended (in comparison with the prototype) up to 3500×2000 mm which leads to considerable speeding-up of scrap charging and liquid iron pouring-in. The chamber depth according to the present invention exceeds the depth of conventional Martin furnaces or conventional multichambered steelmaking apparatuses and makes up not less than 2 m. This feature ensures better metal mixing conditions in the course of melting.

Installation of 3 blowing oxygen supply tuyeres in the roof of each smelting chamber ensures substantial intensification of the oxygen blow in the chamber. Availability of two gas-oxygen burners in each of the chambers ensuring CO gases afterburning, said CO gases being supplied from one chamber into another, intensifies the heating of metalline charge by said CO gases in a coaxial chamber.

The invention according to the Patent UA 9024 (a prototype) teaches a method of steelmaking in a multichambered steelmaking apparatus, according to which the following steps are provided: mold-less charging of metal scrap, pouring-in liquid iron directly into the steelmaking apparatus chamber from a ladle through input ports provided in the chamber front wall, charging of flux, oxygen blow with removal of exit gases into a coaxial chamber in purpose of heating the cold metalline charge already charged. After heating and melting of the metalline charge in a first chamber buffing is conducted with intermediary slagging-off through a process port. Then a new slag is formed and after the pure boiling step and processing steel up to a predetermined chemical composition, the steel is discharged from the chamber.

Major deficiencies in this method are: incomplete use of exit gases heat in purpose of heating metalline charge in a coaxial (cold) chamber, insufficient strength of the lining (since the loaded metalline charge can damage a hearth welded layer and a hearth lining), insufficiently high scrap charging speed and liquid iron pouring-in speed, which leads to decrease in apparatus efficiency and ready product output.

It is a technical object of the method claimed herein to increase steelmaking efficiency, to increase ready product output due to the scrap charging time and iron pouring-in time reduction, to accelerate the metalline charge heating by means of increasing heat utilization efficiency, to increase the lining strength.

The above-mentioned object is accomplished as described below.

The method of steelmaking using the above-described multichambered steelmaking apparatus according to the present invention includes the following steps: charging a smelting chamber with fireproof powders, metal scrap charging through input ports arranged in the smelting chamber front wall by means of scoops, pouring-in liquid iron through the said input ports, charging of flux, oxygen blow with removal of exit gases to the second smelting chamber for heating the already charged cold metal scrap and further exhaust gases removal through a gas exhaust channel into chimneys, heating and melting of the metalline charge, subsequent buffing with intermediary slagging-off through a process port provided in the front wall between the input ports, formation of a new slag, pure boiling stage, processing steel up to a predetermined chemical composition and discharging steel, wherein metal scrap is charged into the smelting chamber in combination with flux and, as this takes place, while metal scrap and flux charging and liquid iron pouring-in the smelting chamber is tilted in the direction of its back wall at an angle of between 20 and 30° relative to its vertical axis; while intermediary slagging-off the smelting chamber is tilted in the direction of its front wall and while tapping-off steel the smelting chamber is tilted in the direction of its back wall at an angle of 45° relative to its vertical axis. Furthermore in the course of the described process the carbon monoxide is underwent afterburning up to $CO_2$ in the exit gases being supplied to the second smelting chamber in purpose of heating cold metal scrap. Lime and/or limestone performing the function of flux can be charged into the smelting chamber. Meanwhile a portion of slag from a previous heat can be retained in the smelting chamber and oxygen blow intensity is 2.5 $nm^3$/ton per 1 minute, pressure keeping in the range of between 12 and 15 atmospheres. Big off-size pieces of scrap having weight of between 15 and 20 tons also can be charged into the smelting chamber.

During metal scrap charging and liquid iron pouring-in the smelting chamber is tilted in the direction of its back wall at an angle of between 20 and 30° relative to the vertical axis of the furnace which enables accelerated metalline charge loading directly onto the steelmaking apparatus hearth through the process input ports. Should the said angle of rotation be less than 20°, turning over the scoop with metal scrap and flux into the apparatus is impossible. Should the said angle exceed 30°, it could result in the apparatus back wall lining strength reduction.

The angle of rotation in the direction of the process port during the slagging-off step is 18°. This value is an experimental result; it is optimum with regard to avoiding molten metal splash-out during the slagging-off stage.

Placing an even layer of flux (lime or limestone having width of between 10 and 30 cm) on the surface of the metalline charge which is being loaded, ensures combined charging of flux and metal scrap, which results in solid metalline charge loading time reduction. The oxygen blow intensity is 2.5 $nm^3$/min while pressure being between 12 and 15 excessive atmospheres, which ensures intensive metal mixing. As this takes place, the steelmaking process is accelerated. Also processing of large off-size metal scrap pieces becomes possible, due to the intermediary scrap heating as well (the weight of such metal scrap pieces can be up to 15–20 tons if compared with pieces processed in the oxygen converter and having weight of 2–3 tons).

The essence of the group of inventions disclosed herein consists in the following. The steel is made in an apparatus having intermediate status between an oxygen converter and a multichambered steelmaking apparatus. The disclosed steelmaking technology using a multichambered apparatus successfully combines advantages of converter melting and melting in a multichambered furnace. Similar to the converter process, steelmaking in the said apparatus is effected without supplying additional fuel, it is carried out only by using heat of iron impurities burning-out exothermic reactions. Similar to the steelmaking process in a multichambered apparatus, the disclosed method is divided into two stages. Oxygen blow is being carried out in a "hot" chamber, metal melting process is running and hot exit process gases are being supplied into a neighbor "cold" chamber. A cold metalline charge loaded into the "cold" chamber is being heated in this chamber and metalline charge melting process is being accelerated. After that the exit gases are removed through the gas cleaning system—into a chimney. Carbon monoxide (CO) afterburning in the exit gases ensures quicker heating of metalline charge. Furthermore, exit gases perform a function of a shield in a "cold" chamber and protect the scorching roof from the impact of the next portion of cold metalline charge being loaded, thus ensuring constant (i.e. without harsh overfall) roof temperature and increasing its lining strength. It is also worth saying that iron oxides contained in the exit gases are partially adsorbed by cold metalline charge of the neighbor chamber of the apparatus which results in reduction of said iron oxides content in the exhaust gases being removed through the gas-cleaning system. Furthermore it leads to diminishing of metal losses and increasing ready product output. Moreover, afterburning of the carbon monoxide (CO) decreases its removal into the atmosphere and thus has a favorable environmental effect.

After heat discharging from the "hot" chamber a metalline charge is loaded into said chamber. This chamber becomes "cold" and the process recurs.

It is advisable that a certain quantity of slag from the previous heat should be retained in the smelting chamber. In this event, on the one hand, the slag ensures better protection of a hearth from beating by big pieces of metal scrap (consequently, the lining strength is increased) and, on the other hand, the process of a new slag formation is accelerated.

Thus the offered apparatus and method of steelmaking in such apparatus combine all advantages of the oxygen-converter process and smelting in a multichambered steelmaking apparatus and has another advantages as described below.

In spite of liquid iron use as the main heat-carrier there is a possibility of diminishing expenditure thereof, in comparison with the oxygen-converter process, up to 570–730 kg/ton (while the iron expenditure in a converter usually keeps within the limits of between 860 and 950 kg/ton).

The above-described technological process running in the offered apparatus is characterized by higher heat utilization efficiency if compared with a converter. The said heat utilization efficiency is calculated as a ratio of the heat portion spent directly for the steelmaking—to the heat total quantity. The heat-utilization efficiency does not exceed 30% in a converter though according to the offered invention it reaches 78–90%. Furthermore, higher strength of the lining is ensured (ensuring up to 2500 heats).

Regular discharge of heats (each 35–45 minutes) effected by the steel-making apparatus ensures favorable conditions for combining said apparatus with a steel continuous tapping-off apparatus.

BRIEF DESCRIPTION OF THE DRAWING

The essence of the offered invention can be described, by way of example, with reference to the accompanying drawing in which:

FIG. 2 is a view of the claimed apparatus from one side during metal scrap charging and liquid iron pouring-in;

DESCRIPTION OF THE APPARATUS PREFERRED EMBODIMENT

Figure 1:
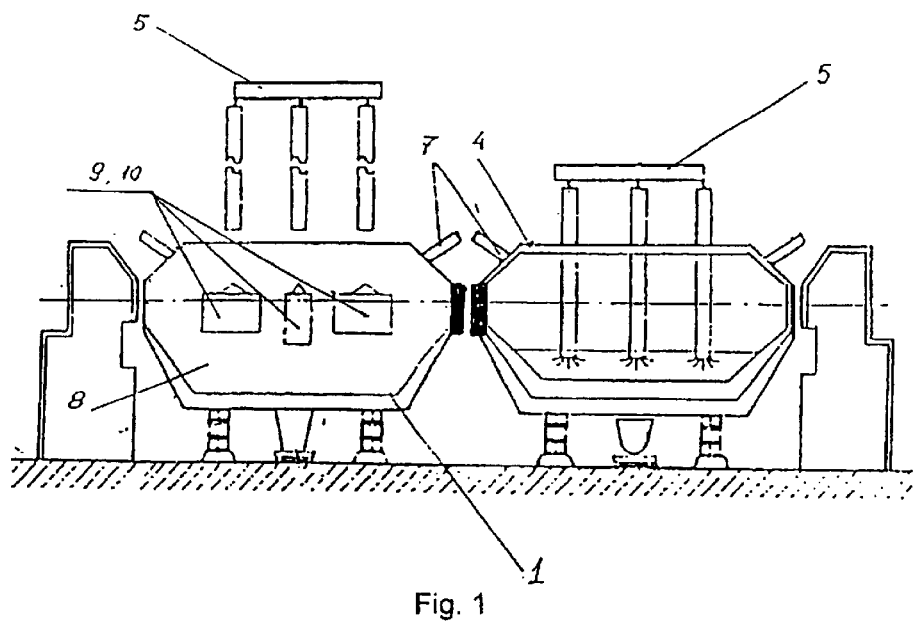
FIG. 1 is a view of a cross-section of the claimed double-chambered steelmaking apparatus.
Figure 2:
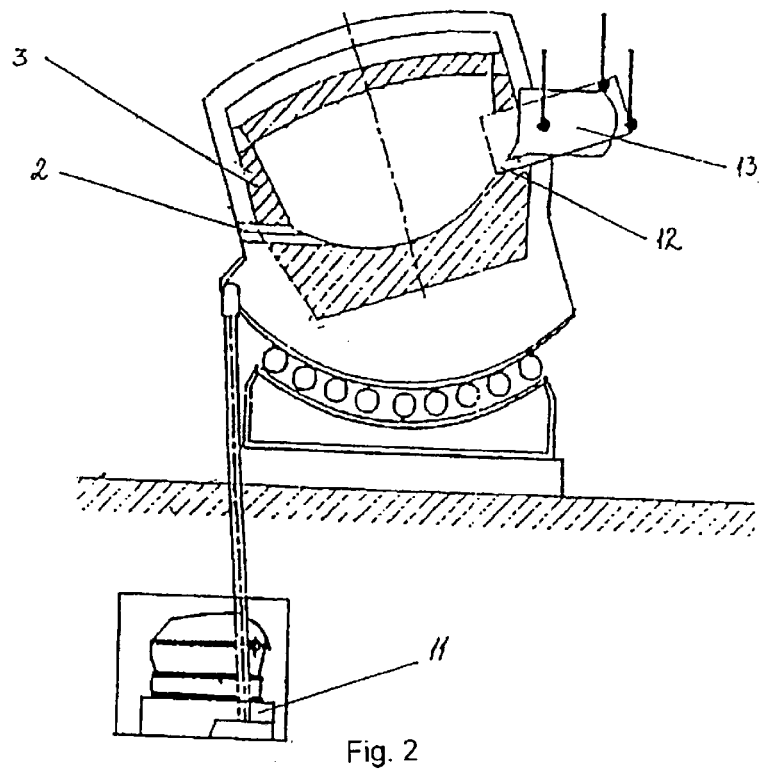
Figure 3:
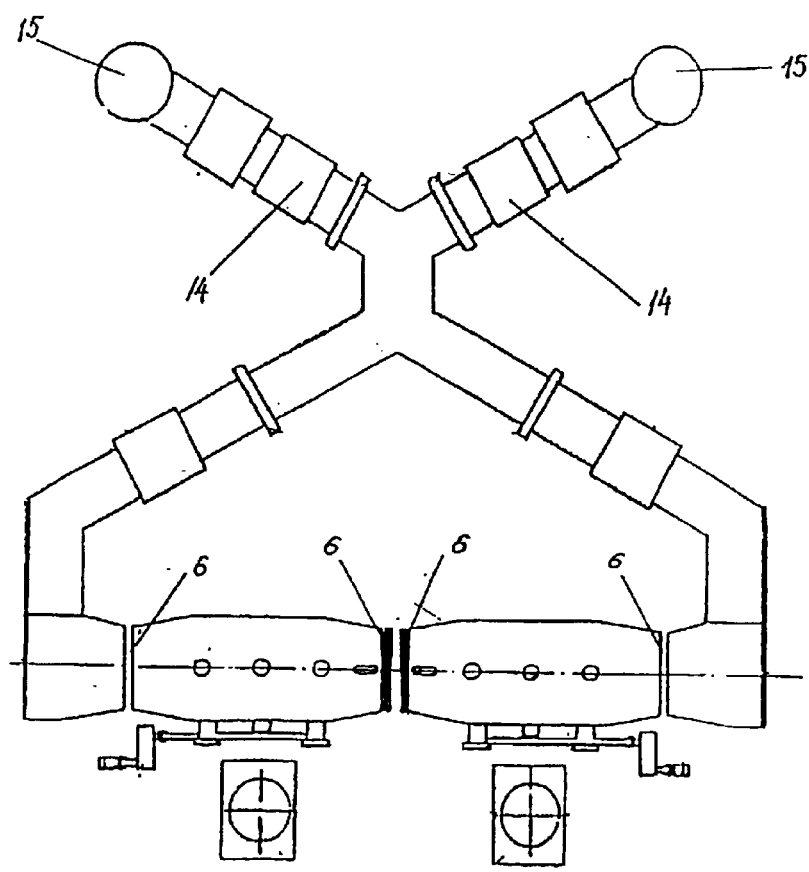
FIG. 3 is a view of the claimed apparatus from above.

A multichambered steelmaking apparatus according to the invention contains two smelting chambers communicating with each other through their upper portions. Each chamber comprises a hearth 1 with an outlet 2 arranged on the side of back wall 3 of the smelting chamber, a roof 4 with three oxygen supply tuyeres 5 installed in said roof 4 and with gas-oxygen burners 7 installed in the roof on the side of the chamber side walls 6 and applied in purpose of afterburning CO contained in the exit gases. Two process input ports 9 are provided in the front wall 8, said process input ports having the threshold level of +9400 mm. A process port 10 intended for slagging-off is arranged between the process input ports 9. Each smelting chamber has a device 11 enabling smelting chambers rotation about their horizontal axes. Due to the use of said device 11 the chambers are turned in the direction of the front or back wall at an angle of up to 45° relative to their horizontal axes, depending on a technical operation to be carried out. The FIG. 2 shows such a position of the smelting chamber when said chamber has been turned at an angle of between 20 and 30° in the direction of the back wall 3 during the metal scrap charging by means of the scoops 12 which sizes correspond to the sizes of the process input ports 9 having a width of 3500 mm and a height of 2000 mm. Liquid iron is poured into the chamber from a ladle 13 through the process input ports 9. The chamber is provided having a depth not less than 2 m.

DESCRIPTION OF THE METHOD PREFERRED EMBODIMENT

Now an example of the claimed method will be described. This method is based on the multichambered steelmaking apparatus offered herein.

A smelting chamber of the steelmaking apparatus having a capacity of 250 tons is charged with fireproof powders. The smelting chamber is turned in the direction of its back wall 3 at an angle of between 20 and 30° about the chamber horizontal axis. Metal scrap in combination with flux is charged into the smelting chamber through the process input ports 9 using the scoops 12. The said metal scrap and flux are charged onto a portion of the slag from a previous heat that was retained in the smelting chamber. After loading of the solid charge and heating thereof during seven minutes, liquid iron is supplied from the ladle 13 through the input ports 9 directly into the chamber without use of a loading chute. In purpose of liquid iron pouring-in facilitation and acceleration the ladle 13 is provided with a special improved lip. The chamber is restored in a horizontal position. Then oxygen blow is conducted through three oxygen supply tuyeres installed in the roof. Intensity of such oxygen blow is approximately 2.5 nm$^3$/ton per 1 minute and pressure is from 12 up to 15 atmospheres. Exit gases coming from the apparatus chamber are underwent afterburning by means of two gas-oxygen burners 7 and then are supplied to the "cold" chamber for heating cold metalline charge loaded therein. After that the exit gases are removed through the gas-cleaners 14 and chimneys 15 through the gas-removal channel. The draught is ensured to be so strong that in spite of intensive blow the gases can hardly penetrate into the furnace shop. CO afterburning is also carried out in regeneration chambers and in smoke flues.

During melting the metalline charge is heated and melted. Then the chamber buffing with intermediary slagging-off through the process port 10 is accomplished. The threshold level of the process part 10 is executed at the height of +8900 mm. The width of the port 10 is 1250 mm. In purpose of intermediary slagging-off the chamber is tilted in the direction of its front, wall 8 at an angle of 18° relative to its horizontal axis. Then the chamber is restored in horizontal position, a new slag is formed, the steps of pure boiling and processing steel up to a predetermined chemical composition are accomplished. After that the chamber is turned in the direction of its back wall at an angle of 45° about its horizontal axis and steel is tapped off the apparatus through the outlet 2 and is supplied to a teeming ladle while the slag is supplied into a dump-cinder car.

The experimental smelting time indices are described with regard to an apparatus having capacity of 250 tons as shown below (by stages):

| | |
|---|---|
| Charging a steelmaking chamber with fireproof powders | 15 min |
| Scrap charge | 6 min |
| Heating | 7 min |
| Liquid iron pouring-in | 5 min |
| Oxygen blow, including metal finishing | 30 min |
| Steel tapping-off | 10 min |
| Other steps | 7 min |
| Total smelting time | 80 min (1 hour 20 min) |

When apparatus capacity and particular steelmaking conditions vary the smelting time can fluctuate in the range of between 70 and 90 minutes. Thus the group of inventions claimed herein ensures smelting time reduction by 10–15 minutes. The disclosed technology ensures efficient operation of each part of apparatus and rhythmical heats discharging each 35–45 minutes.

As was mentioned above, a new steelmaking apparatus ensures high strength of lining (up to 2500 heats) due to "cautious" metalline charge loading, apparatus scorching roof shielding against cold metalline charge by process gases coming out of the "hot" chamber, retaining a slag portion from the previous heat in the smelting chamber. The offered technology has an environmental protection effect.

Thus the offered group of inventions ensures high steelmaking efficiency (from 2.0 up to 4.0 millions of tons of liquid steel annually depending on a furnace capacity), safe personnel work conditions. The offered apparatus and method are perfect with regard to environmental protection if compared with a conventional multichambered furnace. Furthermore, they create conditions for steelmaking cost reduction due to simplification of metal scrap charging and liquid iron pouring-in, steel and slag tapping off which, in its turn, is caused by availability of a tilting mechanism in both smelting chambers of the apparatus. The steelmaking cost is

What is claimed is:

1. A multichambered steelmaking apparatus comprising:
   at least two smelting chambers communicating with each other through their upper portions,
   each smelting chamber comprising at least a roof, a hearth with an outlet arranged on the side of a chamber back wall, chamber side walls and a chamber front wall with input ports and a process port arranged between said input ports,
   at least one oxygen supply tuyere installed on each said roof,
   a gas exhaust channel with a gas-cleaning system and a chimney, wherein each of said smelting chambers is provided with a tilting device and means for tilting in the direction of said front and back walls at an angle of up to 45° relative to a vertical axis; and
   said roof comprising a gas-oxygen burner installed on the side of each of said smelting chamber side walls.

2. A multichambered steelmaking apparatus, according to claim 1, wherein:
   each smelting chamber comprises three oxygen supply tuyeres.

3. A multichambered steel making apparatus, according to claim 1, wherein:
   said apparatus further includes metal scrap charging scoops; and
   the sizes of said input ports correspond to said metal scrap charging scoops.

4. A method of steelmaking in a multichambered apparatus comprising steps of:
   charging of a smelting chamber with fireproof powders,
   metal scrap charging through one of at least two input port arranged in a first smelting chamber front wall by means of scoops,
   pouring-in of liquid iron through said input ports,
   charging of flux,
   conducting an oxygen blow with removal of exit gasses into th a second smelting chamber for heating the charged cold metal scrap and further removing of gasses through a gas exhaust channel into a chimney,
   heating and melting of the metalline charge,
   buffing with intermediary slagging-off through a process port provided in the front wall between said input ports,
   executing a formation of a new slag, pure boiling stage, and processing the steel up to a predetermined chemical composition; and
   discharging the steel, wherein metal scrap is charged into said smelting chamber in combination with flux, provided that during the steps of scrap and flux charging and liquid pouring-in the first smelting chamber is tilted in the direction of a back wall at an angle of between 20 and 30° relative to a vertical axis, while during said intermediary step of slagging-off the first smelting chamber is tilted in the direction of its front wall, and while discharging said steel the first smelting chamber is tilted in the direction of the back wall at an angle of 45° relative to said vertical axis, and furthermore providing that during said step of conducting oxygen blowing carbon monoxide undergoes afterburning in exit gasses supplied to the second smelting chamber for heating cold metal scrap.

5. A method, according to claim 4 wherein said method further includes the step of:
   charging lime and/or limestone, performing the function of flux, into the first smelting chamber.

6. A method, according to claim 4 whereinsaid method further includes the step of:
   retaining a portion of a slag from a previous heat in the smelting chamber after said step of discharging.

7. A method, according to claim 4 wherein: an intensity of said oxygen blow is 2.5 $nm^3$/ton of steel per 1 minute, a pressure being in the range of between 12 and 15 atmospheres.

8. A method, according to claim 4 wherein: during said step of charging, pieces of scrap, including at least one piece having weight of between 15 and 20 tons, are loaded into the smelting chamber.

9. A multichambered steelmaking apparatus according to claim 1, wherein each smelting chamber comprises two gas-oxygen burners.

10. A multichambered steel making apparatus according to claim 2, wherein each smelting chamber comprises two gas-oxygen burners.

11. A multichambered steelmaking apparatus, comprising:
    at least two smelting chambers communicating with each other;
    each said smelting chamber comprising a roof, a hearth, an outlet arranged on a side of a chamber back wall, a set of side walls and a front wall with two input ports and a process port arranged between said input ports;
    each said smelting chamber including at least three oxygen supply tuyere installed in said roofs;
    a gas exhaust channel including a gas-cleaning system and at least one chimney;
    each said smelting chamber provided with a tilting device and means for tilting in the direction of said front and back walls at an angle of up to 45° relative to a vertical axis;
    means for moving each said tuyeres in a vertical direction;
    each said smelting chamber further comprising at least two gas-oxygen burners installed on said opposite side walls of said smelting chambers, facing each other at an angle, and located at an angle relative a horizontal axis of said chamber; and
    a threshold level of said process port being located lower than a threshold level of said input ports.

12. A muitichambered steel making apparatus, according to claim 1, wherein:
    said process port is narrower then respective said input ports.

13. A multichambered steel making apparatus, according to claim 1, wherein:
    a threshold level of said process port is lower than a threshold level of respective said input ports.

14. A multichambered steelmaking apparatus, comprising:
    at least two smelting chambers communicating with each other;
    each said smelting chamber comprising a roof, a hearth, an outlet arranged on a side of a chamber back wall, a set of side walls and a front wall with two input ports and a process port arranged between raid input ports;
    each said smelting chamber including at least one oxygen supply tuyere installed in said roofs;
    means for moving said at least oxygen supply tuyere vertically relative to respective said chamber;

a gas exhaust channel including a gas-cleaning system and at least one chimney;

each said smelting chamber provided with a tilting device and means for tilting in the direction of said front and back walls at an angle of up to 45° relative to a vertical axis;

means for moving each said tuyeres in a vertical direction; and each said smelting chamber further comprising at least two gas-oxygen burners installed on said opposite side walls of said smelting chambers, facing each other at an angle, and located at an angle relative a horizontal axis of said chamber.

15. A multichambered steelmaking apparatus, comprising:

at least two smelting chambers communicating with each other;

each said smelting chamber comprising a roof, a hearth, a outlet arranged on a side of a chamber back wall, a set of side walls and a front wall with two input ports and a process port arranged between said input ports;

each said smelting chamber including at least one oxygen supply tuyere installed in said roofs;

means for moving said at least one oxygen supply tuyere vertically relative to respective said chamber;

a gas exhaust channel including a gas-cleaning system and at least one chimney;

each said smelting chamber provided with a tilting device and means for tilting in the direction of said front and back walls at an angle of up to 45° relative to a vertical axis, means for moving each said tuyeres in a vertical direction, each said smelting chamber further comprising at least two gas-oxygen burners installed on said opposite side walls of said smelting chambers, facing each other at an angle, and located at an angle relative a horizontal axis of said chamber; and, a threshold level of said process port being located lower than a threshold level of said input ports.

* * * * *